(12) United States Patent
Walters et al.

(10) Patent No.: US 10,984,305 B1
(45) Date of Patent: Apr. 20, 2021

(54) SYNTHETIC CLICKSTREAM TESTING USING A NEURAL NETWORK

(71) Applicant: Capital One Services, LLC, McLean, VA (US)

(72) Inventors: Austin Walters, Savoy, IL (US); Jeremy Goodsitt, Champaign, IL (US); Galen Rafferty, Mahomet, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/743,853

(22) Filed: Jan. 15, 2020

(51) Int. Cl.
| | |
|---|---|
| *G06N 3/00* | (2006.01) |
| *G06N 3/04* | (2006.01) |
| *G06F 16/906* | (2019.01) |
| *G06F 16/9535* | (2019.01) |
| *G06N 3/08* | (2006.01) |

(52) U.S. Cl.
CPC .......... *G06N 3/006* (2013.01); *G06F 16/906* (2019.01); *G06F 16/9535* (2019.01); *G06N 3/0454* (2013.01); *G06N 3/088* (2013.01)

(58) Field of Classification Search
CPC ...... G06N 3/006; G06N 3/088; G06N 3/0454; G06F 16/906; G06F 16/9535
See application file for complete search history.

(56) References Cited

U.S. PATENT DOCUMENTS

| | | |
|---|---|---|
| 10,209,974 B1 | 2/2019 | Patton et al. |
| 2017/0031920 A1 | 2/2017 | Manning et al. |
| 2018/0107902 A1 | 4/2018 | Yang et al. |
| 2019/0114348 A1 | 4/2019 | Gao et al. |

OTHER PUBLICATIONS

Antulov-Fantulin, Nino et al.; Synthetic Sequence Generator for Recommender Systems—Memory Biased Random Walk on a Sequence Multilayer Network; Springer; LNAI 8777, pp. 25-36, 2014. (Year: 2014).*

Melnykov, Volodymyr; Model-based biclustering of clickstream data; Elsevier; Computational Statistics and Data Analysis 93 (2016) 31-45. (Year: 2016).*

Hanamanthrao, Ramanna et al.; Real-Time Clickstream Data Analytics and Visualization; 2017 2nd IEEE International Conference on Recent Trends in Electronics Information & Communication Technology (RTEICT), May 19-20, 2017, India; pp. 2139-2144. (Year: 2017).*

Xylogiannopoulos, Konstantinos et al.; Clickstream analytics: An experimental analysis of the Amazon users' simulated monthly traffic; 2018 IEEE/ACM International Conference on Advances in Social Networks Analysis and Mining (ASONAM); pp. 841-848. (Year: 2018).*

Mogren, O. "C-RNN-GAN: Continuous Recurrent Neural Networks with Adversarial Training", arXiv preprint arXiv:1611.09904, 2016, pp. 1-6.

* cited by examiner

*Primary Examiner* — Stanley K. Hill
(74) *Attorney, Agent, or Firm* — Sterne, Kessler, Goldstein & Fox P.L.L.C.

(57) ABSTRACT

Disclosed herein are system, method, and computer program product embodiments for simulating users for testing websites using a trained model. Simulating users involves training a model to generate realistic synthetic clickstreams that emulate actual clickstreams. Synthetic clickstreams may include simulated mouse actions and keystrokes and the results of the testing may be used to improve the design and functioning of the tested website.

20 Claims, 7 Drawing Sheets

SYNTHETIC CLICKSTREAM TESTING USING A NEURAL NETWORK

BACKGROUND

User testing is an important tool for designing and implementing websites. Where a well-designed website may be user-friendly and enhances click-through rates and other desired user actions, a poorly-designed website may impose unnecessary interface obstacles that hinder a user's ability to navigate and use that website. Even a single percentage difference in click-through traffic on a popular website could result in a dramatic increase (or decrease) in revenue generation activity on that website. Accordingly, an important aspect of designing a website is using user testing to determine the optimal placement and organization of elements on the website to maximize the number of desired user actions (e.g., transactions, click-throughs, conversions) for that website.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
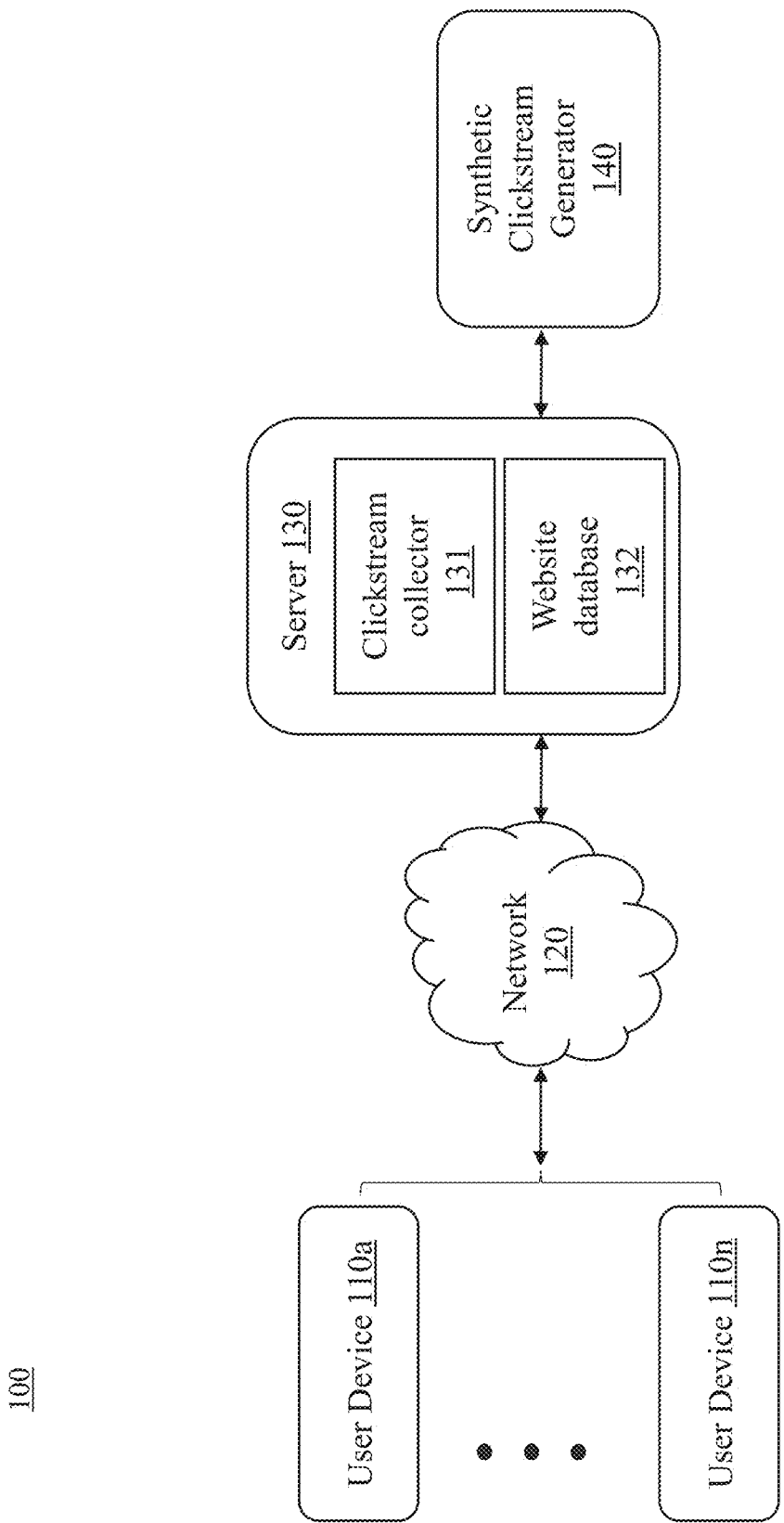
FIG. 1 depicts a block diagram of a system for testing websites using generated synthetic clickstreams, according to some embodiments.

Provided herein are system, apparatus, device, method and/or computer program product embodiments, and/or combinations and sub-combinations thereof, for collecting clickstream data from at least one web server and generating, using a neural network, synthetic clickstream data based on the collected clickstream data. The synthetic and collected clickstream data may be used to train the neural network. The trained neural network may then test a website by, for example, generating synthetic or predicted clickstreams for variations of the website, such as first and second variations of the website, and collecting, from the trained neural network, test results that are based on executing the synthetic clickstream on the variations of the website. The website may be implemented, based on the first result and the second result, using one of the variations.

Also provided herein are system, apparatus, device, method and/or computer program product embodiments, and/or combinations and sub-combinations thereof, for using multiple trained neural networks, such as first and second trained neural networks, to test a website, wherein the trained neural networks are trained based on user archetypes, such as a first user archetype and a second user archetype, but there may be any number of archetypes that are utilized. The trained neural networks may each generate multiple predicted clickstreams, such as first and second predicted clickstreams for a first trained neural network and third and fourth predicted clickstreams for a second trained neural network, for variations of the website. Results may be collected from the trained neural networks such as first and second results based on executing the first and second predicted clickstreams on first and second variations of the website and third and fourth results based on executing the third and fourth predicted clickstreams on the first and second variations of the website. The website may be implemented, based on the first result, the second result, the third result, and the fourth result, using one of first variation of the variations.

These described techniques leverage the power of neural networks to provide a novel way for testing and implementing websites using trained user models and synthetically generated clickstreams which simulate user interactions with the website. In the present disclosure, models are trained from collected clickstream data, such as from actual user interactions with websites, and neural networks and the trained models generate the synthetic clickstreams. Using synthetically generated clickstreams enable more efficient testing of websites which can lead to faster improvements to a website's design.

These techniques also enable the training of multiple models where each model may represent a particular user archetype which defines users based on a particular characteristic of the user. Examples of user archetypes include a user age, a user's network speed, a user salary, and a user income. Multiple models may be trained based on collected clickstream data that has been clustered based on the user archetype. In some embodiments, separate models are trained based on the clustered collected clickstream data and each trained model may be representative for each user archetype. Using each trained model for a website may then produce testing results that indicate how a user of that archetype would use the website. As one non-limiting example, a trained model may be provided to simulate users (e.g., by generating synthetic clickstreams representative of those users) of a certain age range (e.g., 20 to 30), another trained model may be provided to simulate users of another certain age range (e.g., 50 to 65), and yet another trained model may be provided to simulate users in a certain income range (e.g., $20,000 to $30,000).

In view of the foregoing description and as will be further described below, the disclosed embodiments enable flexible testing websites using simulated users (via synthetic clickstreams) where this testing may be customized to model different user archetypes. In particular, each trained model may represent a different archetype of simulated user and the synthetic clickstreams generated from each trained model may be representative of the interactions for each archetype.

Various embodiments of these features will now be discussed with respect to the corresponding figures.

FIG. 1 depicts a block diagram of a system 100 for testing websites using generated synthetic clickstreams, according to some embodiments. System 100 may include a plurality of user devices 110*a* to 110*n*, network 120, server 130, and synthetic clickstream generator 140. User devices 110*a* to 110*n* may be connected to server 130 through network 120.

User devices 110*a* to 110*n* may include any combination of devices, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, augmented reality headsets, etc.), a personal computer (PC), or a similar type of device that enables users to interact with websites. In some embodiments, user devices 110*a* to 110*n* allow interactions with one or more websites provided by server 130 that results in clickstreams to be collected at server 130. These clickstreams may include the user's interactions with the one or more websites such as mouse (cursor) movements, mouse clicks, mouse hovers (e.g., length of time a cursor hovers a particular website element such as a text box), and keyboard strokes. Synthetic clickstreams may include the same types of interactions but are simulated rather than collected from actual user interactions.

Network 120 may be implemented as one or more wired and/or wireless networks. For example, network 120 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Server 130 may be implemented as one or more server device (e.g., a host server, a web server, an application server, etc.), a data center device, or a similar device, capable of communicating with mobile device 110 via network 120. Server 130 may include clickstream collector 131 and website database 132. In some embodiments, server 130 may be implemented as a plurality of servers that function collectively as a distributed database for providing one or more websites to user devices 110*a* to 110*n* and collecting data received from user devices 110*a* to 110*n*.

In some embodiments, server 130 may be used to collect clickstreams provided by user devices 110*a* to 110*n*. Clickstream collector 131 collects user clickstreams provided when user devices 110*a* to 110*n* interact with websites provided from server 130. Because server 130 may be implemented as one or more server device, websites may include any number of websites that are either affiliated with server 130 or have otherwise provided permission for server 130 to collect clickstream information associated with those websites. Website database 132 may be implemented as one or more database device within server 130 or distributed across multiple servers when server 130 is implemented as a plurality of servers. Website database 132 provides access to websites upon request from user devices 110*a* to 110*n*.

Synthetic clickstream generator 140 may be implemented as one or more devices either remote from server 130 or installed as a component of server 130. For example, synthetic clickstream generator 140 may be implemented as hardware or a combination of hardware and software such as processors, active and passive components, circuitry, control logic, or a combination thereof. Synthetic clickstream generator 140 may be provided collected user clickstreams by server 130 and may be configured to train synthetic clickstream models based on the collected user clickstreams and then test websites based on the trained synthetic clickstream models.

The role of synthetic clickstream generator is to produce trained user models that simulate users by generating synthetic clickstreams that closely mimic actual clickstreams of actual users. Synthetic clickstreams, like actual clickstreams, include any combination of mouse and keyboard strokes related to a user's interaction with a website such as mouse (cursor) movements, mouse clicks, mouse hovers (e.g., length of time a cursor hovers a particular website element such as a text box), and keyboard strokes.

In some embodiments, user model of synthetic clickstream generator 140 may be implemented using a neural network such as a convolutional neural network (CNN) model, a recurrent neural network (RNN) model, a generative adversarial network (GAN) model, or any combination of these network models (e.g., a CRNN which is a combination of a CNN and a RNN, a CRNN-GAN which is a combination of a CRNN and a GAN). Neural networks may be implemented as hardware or a combination of hardware and software such as processors, active and passive components, circuitry, control logic, or a combination thereof The following discussion focuses on the non-limiting embodiment where synthetic clickstream generator 140 employs a combination of a CRNN and a GAN to be trained for generating synthetic clickstreams for testing websites. In such an embodiment, the CRNN may be implemented as a generator portion of the GAN for processing collected clickstreams and predicting future clickstreams (i.e., generating synthetic clickstreams) based on the collected clickstreams while a discriminator portion of the GAN may be trained based on the output of the CRNN. The discriminator portion may be implemented as any combination of neural networks that is capable of receiving output from the generator portion of the GAN. In some embodiments, the discriminator portion may be implemented as a network with multiple convolution and recurrent layers or a dense network that receives the output as a series of frames.

Continuing the discussion of this particular embodiment, the GAN may include a generator portion and a discriminator portion. In the embodiment where a CRNN is implemented as part of the GAN, the CRNN may be implemented to perform functions of the generator portion. That is, the CRNN may be responsible for generating synthetic clickstreams based on provided collected clickstreams. Training of the GAN takes place between the generator portion and the discriminator portion. The purpose of the GAN is to produce synthetic clickstreams that resemble collected clickstreams; put another, the GAN simulates users' interactions with a website. Once trained, the GAN provides synthetic clickstreams that can be used to test websites; because the synthetic clickstreams closely mimic actions of actual users, results of the testing may be trusted as accurate representations of actual interactions with the websites. The purpose of the discriminator portion is to determine whether the predicted clickstreams resemble actual clickstreams.

The generator portion of the GAN is now discussed. Collected clickstreams from actual user interactions with one or more websites may be provided to the CRNN by server 130. When implemented as part of synthetic clickstream generator 140, the CNN of the CRNN may first employ a convolution procedure for building convolutions which are representations of particular features of a dataset that the CRNN is trying to recognize. In some embodiments, the convolutions built by the CNN of the CRNN include mouse interactions and keystrokes that are part of the collected clickstreams. In other words, the CNN may be used to extract and classify the interactions that are present within the collected clickstreams. These classifications of the mouse interactions may be based on analyzing the cursor action and may include mouse movements, mouse hovering, mouse actions, and a temporal relationship between the mouse actions and keystroke actions (e.g., mouse movement toward a text box may be followed by keystrokes); classifications of the keystrokes include typed keys, display of keystrokes on elements of the website (e.g., a text box), and a temporal relationship between the keystrokes and the mouse interactions.

In an embodiment, the CNN may translate the interactions in the collected clickstreams into respective values. And, based on these translated values, further processing may be performed by the CNN such down-sampling or otherwise reducing the dimensionality of the collected clickstreams to reduce the amount of data to be processed and reducing the computational cost of subsequent steps. Examples of down-sampling including average pooling, which takes an average of each classified portion of the collected clickstream, and max pooling, which takes a maximum value of each classified portion of the collected clickstream. For example, when applying max pooling, down-sampling of the collected clickstreams may result in maximum value of each interaction within the collected clickstreams to produce an output of the CNN.

In an embodiment, the output of the CNN, which represent the extracted features (which may be down-sampled if further processing is performed) from the collected clickstreams, may then be provided to a RNN of the CRNN which may use the classifications of the collected clickstreams to predict future clickstreams of those collected clickstreams. In some embodiments, the RNN may be implemented using a long short term memory (LSTM) network model. The extracted features may be provided in a chart, image, matrix, plot, or other visual depiction showing one or more website interactions such as mouse actions and keystrokes. The extracted features can include any information associated with a user's interaction with a website including the mouse actions and keystrokes. In addition, the extracted features may represent interactions at a particular time or over a period of time (e.g., the entire length of a user's interaction with a website).

In one embodiment, the output of the CNN can be used as an input to another machine learning process that can be used to predict future clickstreams. For example, the extracted features of the collected clickstream can be the input to an RNN to predict future clickstreams. Extracted features may be analyzed over a time period. In one embodiment, predictions may be done by comparing the extracted features within the time period to one another and detecting one or more patterns or correlations between the extracted features. The patterns or correlations can be, for example, extracted features indicating a high probability of exhibiting a certain characteristic or having a certain value based on one or more preceding extracted features exhibiting the certain characteristics or having certain values. For example, certain mouse movements may be correlated in a first time period to a certain portion of a website such as when a user is selecting items for purchase while other mouse movements may be associated with keystrokes in a second time period for another portion of the website such as when the user is completing the purchase and is entering information into text boxes. These types of patterns or correlations may then be used for predicting future clickstreams for a certain period of time or a particular point in time for a user's interaction with a website.

The training of a user model in synthetic clickstream generator 140 is now discussed. Continuing the example of the CRNN-GAN as the neural network, the predicted clickstreams provided by the RNN may be considered synthetic clickstreams. In some embodiments, synthetic clickstream generator 140 trains the neural network using collected (actual) clickstreams provided by server 130. In one embodiment, as part of the training, the predicted clickstreams generated by the RNN may then be provided as the input to discriminator portion of the GAN. The discriminator portion may also receive as input actual clickstreams. The goal of the GAN is for the predicted clickstreams to be indistinguishable from the actual clickstreams; the discriminator portion may compare the predicted clickstreams with the actual clickstreams to assess the accuracy of the predicted clickstreams. Training of the neural network is an iterative process that continues until the discriminator portion cannot distinguish between the predicted and actual clickstreams.

In one embodiment, a predefined success threshold may be established in assessing the accuracy of the predicted clickstreams. For example, the training may stop when the discriminator portion has a threshold success rate in distinguishing between the predicted and actual clickstreams. Specifically, the goal of the threshold success rate is to indicate that the discriminator portion is unable to discern between real and generated clickstream data. In one embodiment where clickstream data includes equal parts generated clickstreams and actual clickstreams, the threshold success rate is 50%. Until the success threshold is met, the discriminator portion may provide results of its assessment to the generator portion to be used to generate a new set of predicted clickstreams.

In some embodiments, the discriminator portion may be implemented as another neural network such as another CNN. Accordingly, in one embodiment where synthetic clickstream generator 140 is implementing using a CRNN-GAN neural network, the structure may be implemented as a CNN, the output of which is used as input for a RNN, the output of which used as input for another CNN, the output of which is used to train the neural network.

Components of synthetic clickstream generator 140 which implement these features are next discussed.

Figure 2:
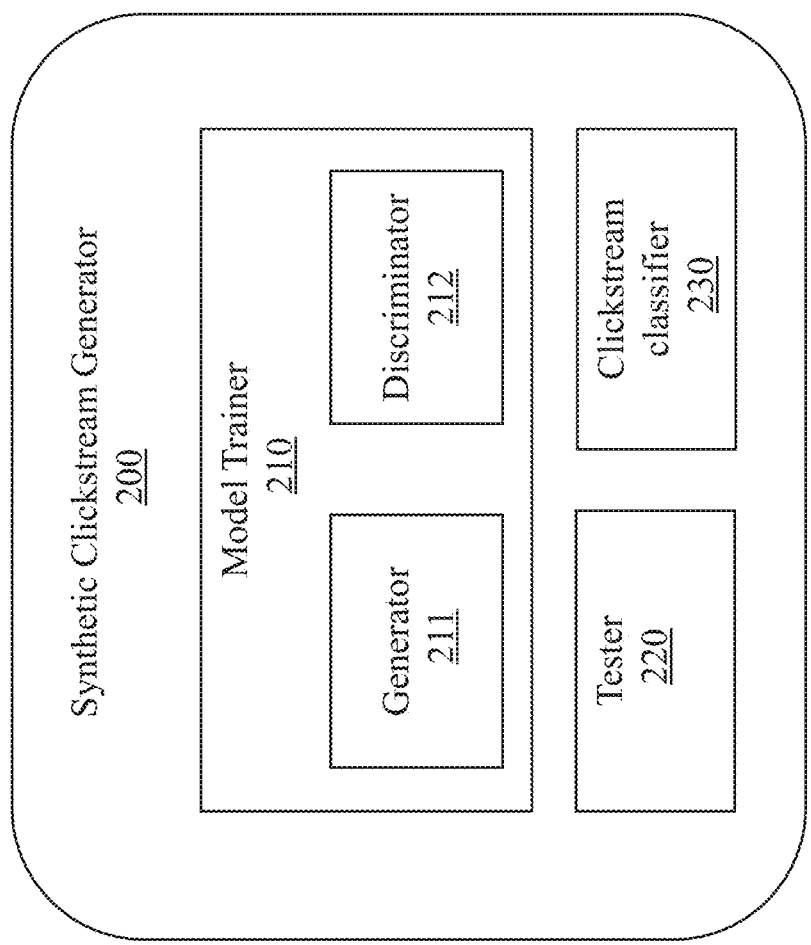
FIG. 2 depicts a block diagram of a synthetic clickstream generator for generating synthetic clickstreams, according to some embodiments.

FIG. 2 depicts a block diagram of synthetic clickstream generator 200 for generating synthetic clickstreams, according to some embodiments. In some embodiments, synthetic clickstream generator 200 represents an implementation of synthetic clickstream generator 140 of FIG. 1. Synthetic clickstream generator 200 may include model trainer 210 which includes generator 211 and discriminator 212, tester 220, and clickstream classifier 230.

Model trainer 210 includes components for processing collected clickstreams and training a model (or models) that is capable of simulating actual users by generating synthetic clickstreams.

In an embodiment, model trainer 210 may be implemented as a neural network, or combination of neural networks. In such an embodiment, the model is trained in an iterative process based on collected clickstreams provided as input to the neural network. Collected clickstreams may be provided by server 130 which may be implemented as a web server that is capable of hosting websites and tracking user interactions with the hosted websites. Over multiple rounds, generator 211 generates synthetic clickstreams and discriminator 212 performs an analysis of the synthetic clickstreams to determine whether they are similar to actual clickstreams. In an embodiment, generator 211 may be implemented us a neural network and discriminator 212 may be implemented as another neural network; in another embodiment, generator 211 and discriminator 212 may be implemented as part of the same neural network. Over each successive round, discriminator 212 provides results of its analysis to generator 211 which uses the results to further refine and improve the generated synthetic clickstreams. The process may continue until some predefined threshold is met such as a certain success rate of discriminator 212 in distinguishing between synthetic clickstreams and actual clickstreams.

Tester 220 uses a trained model (or models) from model trainer 210 for testing websites. Models trained by model trainer 210 may be used by tester 220 to test websites. In an embodiment, websites may be provided by server 130 such as from website database 132.

In an embodiment, testing of the website by tester 220 is performed using principles of AB testing where variations of a website are tested with each variation having differences such as in website components (e.g., headlines, links, images) and placement of those components on the website (e.g., layout). The variations of the provided website may be generated by tester 220 (or provided by server 130) and the variations are tested using the trained model. For example, two variations of a website may be tested using synthetic (predicted) clickstreams generated by the trained model. The variations may be tested using the same synthetic clickstream which may result in different results of the test. Continuing the example, the test may result in first and second results based on using the same synthetic clickstream on the first and second variations of the website.

The results may include information regarding the interaction between the synthetic clickstreams and the website. For example, the results may indicate predicted conversion rate, a predicted failure rate, and/or a predicted usage metric. Conversion rate refers to a rate in which the synthetic clickstreams, when applied to the tested website, results in a transaction (i.e., the rate in which a visitor to the website is converted into customer). Failure rate refers to a rate in which the synthetic clickstreams results in a failure to properly navigate the site such as reaching an error page or access certain features of the website such as certain links. The usage metric refers to statistics associated with how the synthetic clickstreams interact with the website such as the amount of time at which a transaction is made, the amount of time at which is spent navigating to certain links on the website, and the number of attempts made to access certain links. These results are predictive (not actual) since they are based on synthetic and not actual clickstreams.

The results may also include other metrics that indicate information regarding the relationship between the user interaction (e.g., mouse movement or action, keystrokes) and specific components of a website (e.g., link, text box, image). Examples of this relationship include direction and duration of mouse movements with respect to a website component and a temporal relationship between mouse movements and keystrokes (e.g., certain mouse movements that occur before or after certain keystrokes). In some embodiments, metrics may also include measurable web traffic analytics such as bounce rate (percentage of single-page site visits), page view duration, average session duration, pages per session (e.g., average of number of pages viewed during a session), page depth (average number of pages visited by a user within a session), and exit rate.

Clickstream classifier 230 is used to classify or cluster collected clickstreams based on user archetypes to form the collected clickstreams into different clusters of data. The clusters of data may be provided to model trainer 210 to train multiple models with each model corresponding to one or more user archetypes. Examples of user archetypes include any characteristics or behavior that may be associated with a user such as sex of the user, user age (e.g., a specific age or a range), a user network speed (e.g., broadband, 5G, 4G, or DSL), a user income, characteristics of the user device such as operating system, browser, and battery life, and characteristics of user behavior such as mouse movement speed and typing speed.

Moreover, user archetypes may be combined so that clickstreams may be clustered based on multiple user archetypes. In a non-limiting example, collected clickstreams may be classified based on males between 21-30, males between 31-40, females between 21-30, and females between 31-40. In this example, four different models may be trained that would produce synthetic clickstreams that simulate the interactions for each of these four archetypes.

Each trained model may then generate different sets of synthetic clickstreams based on the clusters of the collected clickstreams that were used to train each respective trained model. Model trainer 210 would use the different clusters of data organized by archetype as inputs for training the different models. Model trainer 210 would then produce the different models based on the separate training that occurs for each of the clusters. In an embodiment where there are four separate clusters of synthetic clickstreams, four different models may be produced.

Figure 3:
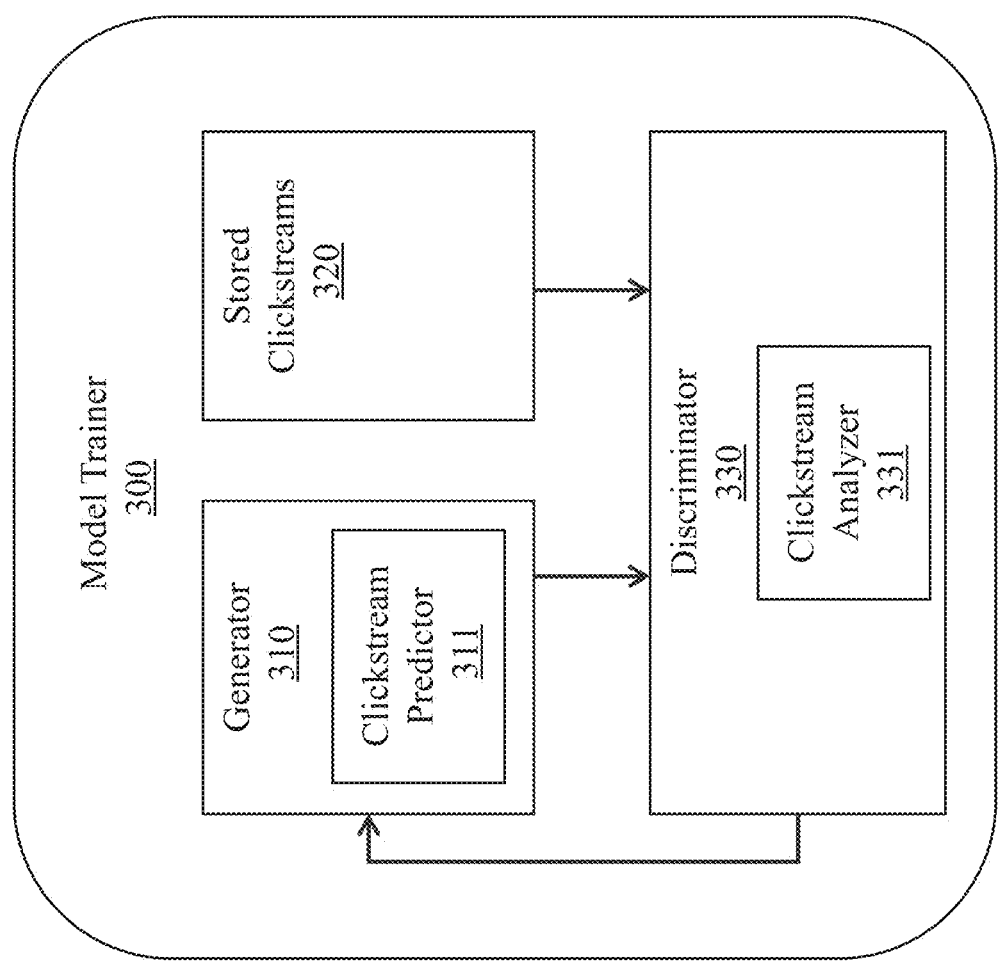
FIG. 3 depicts a block diagram of a model trainer for training synthetic clickstream models that generate synthetic clickstreams, according to some embodiments.

FIG. 3 depicts a block diagram of model trainer 300 for training synthetic clickstream models that generate synthetic clickstreams, according to some embodiments. In some embodiments, model trainer 300 represents an implementation of model trainer 210 of FIG. 2. Model trainer 300 may include generator 310, stored clickstreams 320, and discriminator 330.

In some embodiments, generator 310 represents an implementation of generator 211 of FIG. 2. Generator 310 may include a clickstream predictor 311 for generating synthetic or predicted clickstreams based on collected clickstreams provided by, for example, a web server. Clickstream predictor 311 may be implemented as a CNN (convolutional neural network), a RNN (recurrent neural network), or a combination of a CNN-RNN (i.e., a convolutional recurrent neural network CRNN). Clickstream predictor 311 may first detect specific interactions in the collected clickstreams and use the detected interactions to generate predicted interactions that form the basis of the synthetic clickstreams. These interactions, as previously discussed, include mouse actions and keystrokes for the website. Clickstream predictor 311 may be considered the model that is being trained as it is responsible for generating the synthetic clickstreams.

Stored clickstreams 320 may be implemented as a database of clickstreams from actual user interactions with different websites. These clickstreams may be provided by a web server that tracks the user interactions with the websites and may be provided for storage in model trainer 300 for use in training the models.

In some embodiments, discriminator 330 represents an implementation of discriminator 212 of FIG. 2. Discriminator 330 may include a clickstream analyzer 331 for performing the analysis between the synthetic clickstreams and stored (actual) clickstreams. Synthetic clickstreams are provided by clickstream predictor 311 and stored clickstreams 320. In each iteration of the training process, clickstream predictor 311 adjusts its predictive ability (i.e., is trained) based the results of clickstream analyzer 331 which determines whether the synthetic clickstreams are clickstreams from actual users. When clickstream analyzer 331 is still able to detect whether the synthetic clickstreams provided by clickstream predictor 331 are synthetic (e.g., based on a predefined success rate), clickstream analyzer 331 provides the results of its analysis to clickstream predictor 331 for adjusting the next iteration of synthetic clickstreams. This iterative process may continue until a predefined success rate is met by clickstream analyzer 331.

Figure 4:
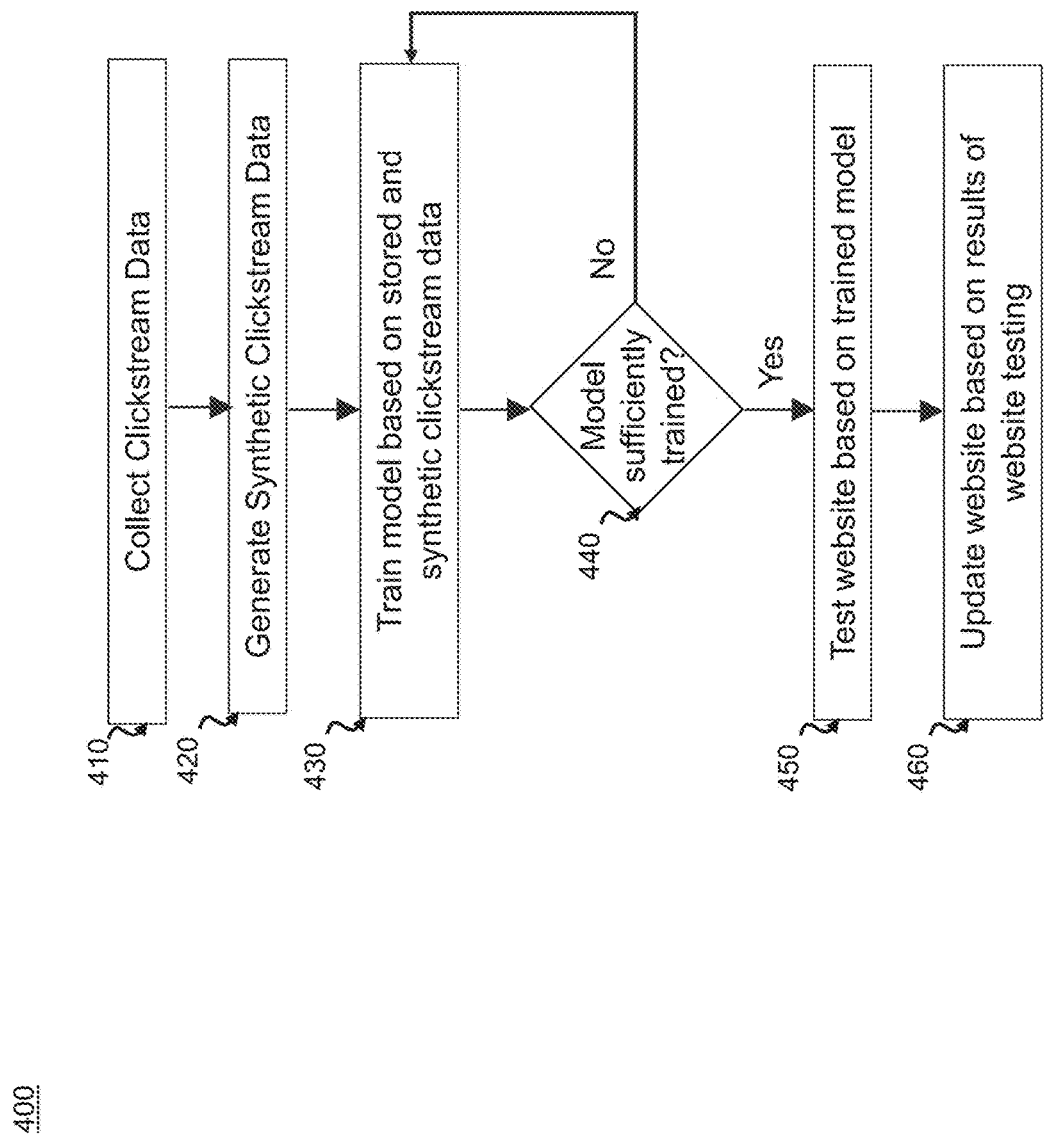
FIG. 4 depicts a flow diagram illustrating a flow for generating a model and testing a website based on the generated model, according to some embodiments.

FIG. 4 depicts a flow diagram of an example method 400 illustrating a flow for generating a model and testing a website based on the generated model, according to some embodiments. As a non-limiting example with regards to FIGS. 1-3, one or more processes described with respect to FIG. 4 may be performed by a server (e.g., server 130 of FIG. 1) or a synthetic clickstream generator (e.g., synthetic clickstream generator 140 of FIG. 1) for training a model based on synthetic clickstreams and testing the website based on the trained model. In such an embodiment, server 130 and/or synthetic clickstream generator 140 may execute code in memory to perform certain steps of method 400 of FIG. 4. While method 400 of FIG. 4 will be discussed below as being performed by server 130 and/or synthetic clickstream generator 140, other devices including may store the code and therefore may execute method 400 by directly executing the code. Accordingly, the following discussion of method 400 will refer to devices of FIGS. 1-3 as an exemplary non-limiting embodiment of method 400. Moreover, it is to be appreciated that not all steps may be needed to perform the disclosure provided herein. Further, some of the steps may be performed simultaneously or in a different order than shown in FIG. 4, as will be understood by a person of ordinary skill in the art.

In 410, clickstream data from actual users are collected. This step may be performed by either server 130 or synthetic clickstream generator 140. As previously discussed, this clickstream data may include mouse actions and keystrokes associated with one or more websites. In some embodiments, clickstream data may be associated with one or more applications such as those are typically installed on mobile devices such as user devices 110a-n. In some embodiments, clickstream data may also comprise a series of images or screenshots of the user interactions that illustrate the mouse actions and/or keystrokes.

In 420, synthetic clickstreams are generated based on the clickstream data. The synthetic clickstreams are intended to mimic interactions of actual users and therefore may represent predicted future movements of the clickstream data. In some embodiments, a user model is used to simulate users based on the synthetic clickstreams. In some embodiments, as discussed above, the user model may be implemented using a neural network may be used to generate the synthetic clickstreams using the actual clickstreams to train the neural network for generating realistic synthetic clickstreams.

In 430, the user model is trained based on synthetic clickstreams and stored clickstreams that represent actual interactions from users from one or more websites. In an embodiment, the training is based on whether the model can distinguish between the synthetic clickstreams and the stored clickstreams. This step may be performed based on comparing the synthetic clickstreams and the stored clickstreams and the model providing a guess as to whether the synthetic clickstreams are from actual users. If the model is unable to distinguish between the synthetic clickstreams and the stored clickstreams (e.g., based on a success rate), the model may be considered to be trained. In some embodiments, when the user model is implemented as a neural network, an iterative training process may be used to refine the synthetic clickstreams that are generated during each round of training.

In 440, a determination is made as to whether the user model is sufficiently trained and ready for testing websites. This sufficiency determination may be based on a predetermined threshold value that establishes a certain success rate in determining whether synthetic clickstreams are actual or synthetic clickstreams. If no, the results of the determination are fed back into the training process for revising the next iteration of synthetic clickstreams. If yes, method 400 proceeds to 450.

In 450, when a model is trained, it may be used to test a website which may include generating synthetic clickstreams, applying those generated synthetic clickstreams to a website and tracking the results of applying the synthetic clickstreams. Applying clickstreams to a website means simulating the mouse actions and keystrokes of the synthetic clickstreams on the website. In an embodiment where AB testing is used, one set of generated synthetic clickstreams is generated for variations of the website which allows for the method to determine which variation to use when implementing the web site.

The results of that simulation may include a recording of the interaction, a failure rate, a conversion rate, metrics associated with the mouse actions and keystrokes, and any errors that may have occurred during the simulated usage of the website. As previously discussed, the metrics provide information regarding the interaction of the mouse and keystrokes with the website and also the relationship between the mouse and keystrokes; metrics may include a duration of mouse movements, a duration of mouse hovers, a length of time between mouse actions and keystrokes, a length of time for a transaction to take place, just to name a few examples. In embodiments where A/B testing is used, there may be two separate results from testing a first and second variation of the website.

In 460, the results of the test implementing, such as the first and second results from A/B testing a first variation of the website and a second variation of the website, may be used to determine which variation should be implemented as the website. The results may be indicative of which variation is more user-friendly. For example, a variation where the synthetic clickstream resulted in a shorter length of time for a transaction to occur (e.g., a purchase) would be more useful than another variation having a longer length of time. Moreover, the results of the test may be used to generate recommendations for adjusting the website such as changes to layout or content of the website. For example, the results may indicate that simulated users are taking a certain amount of time to navigate the website to arrive at a desired transaction; if this amount of time is beyond a predefined threshold, a recommendation may be generated to revise the layout of the website in order to improve the speed of the transaction. In an embodiment, the testing may be iterative such that the results of a first round of testing may be used to further refine variations that are used in the next round of testing based on the recommendations. The testing iterations may continue until a certain threshold for the particular result is met.

Figure 5:
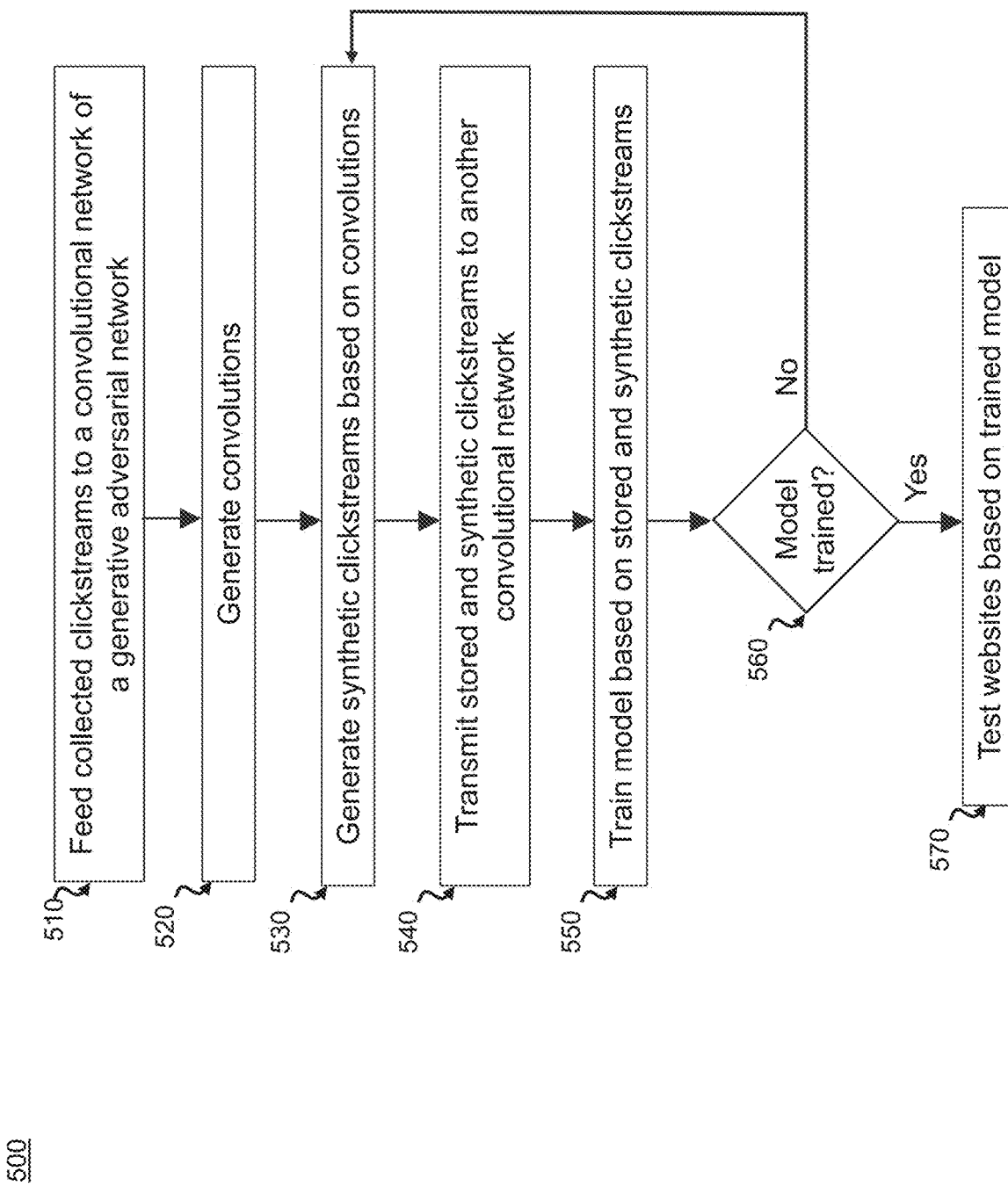
FIG. 5 depicts a flow diagram illustrating a flow for training a model using a convolutional network and a generative adversarial network, according to some embodiments.

FIG. 5 depicts a flow diagram of an example method 500 illustrating a flow for training a model using a convolutional network and a generative adversarial network, according to some embodiments. As a non-limiting example with regards to FIGS. 1-3, one or more processes described with respect to FIG. 4 may be performed by a server (e.g., server 130 of FIG. 1) or a synthetic clickstream generator (e.g., synthetic clickstream generator 140 of FIG. 1) for training a model based on synthetic clickstreams and testing the website based on the trained model. In such an embodiment, server 130 and/or synthetic clickstream generator 140 may execute code in memory to perform certain steps of method 400 of FIG. 4. While method 400 of FIG. 4 will be discussed below as being performed by server 130 and/or synthetic clickstream generator 140, other devices including may store the code and therefore may execute method 400 by directly executing the code. Accordingly, the following discussion of method 400 will refer to devices of FIGS. 1-3 as an exemplary non-limiting embodiment of method 400. Moreover, it is to be appreciated that not all steps may be needed to perform the disclosure provided herein. Further, some of the steps may be performed simultaneously or in a different order than shown in FIG. 4, as will be understood by a person of ordinary skill in the art.

In 510, collected clickstreams are fed to a convolutional network (CNN) which, in this embodiment, represents generator 211 for generating synthetic clickstreams and is a component of a generative adversarial network (GAN) that represents the model to be trained. As discussed previously, a convolutional network may be used to generate convolutions based on the clickstreams where the convolutions represent particular features of clickstream. In some embodiments, these features include mouse movements, mouse actions, and keystrokes.

In 520, the convolutional network generates these convolutions based on the collected clickstreams. The convolutional network parses the clickstreams and organizes the interactions within the clickstreams into the convolutions.

In 530, synthetic clickstreams are generated based on the convolutions. In an embodiment, the synthetic clickstreams are predicted future clickstreams that are extended actions of the actual clickstreams. In an embodiment, this step includes passing the convolutions to a RNN of the GAN which may use the features identified by the convolutions to synthetize clickstreams. In some embodiments, the RNN may be implemented using a long short term memory (LSTM) network model where the actual clickstreams are used to forecast or predict future clickstreams. In an embodiment, the LSTM may work in the following manner. The collected clickstreams may represent user interactions at a particular instance of time or over a period of time. Synthetic clickstreams may be predicted by performing a probability calculation based on the collected clickstreams to determine the likelihood that future clickstreams will have interactions matching the characteristics of the collected clickstreams. For example, mouse movements (e.g., in a certain direction) can be used to predict future mouse movements (e.g., by extending the mouse movements in the actual clickstreams). In an embodiment, the synthesized clickstreams may be generated based on comparing the user interactions of the collected clickstreams to one another and detecting one or more patterns or correlations between the interactions such as the connections between mouse movements, keystrokes, and the components of a website. An example of such a pattern or correlation are specific mouse interactions and keystrokes associated with a text box on a website which may indicate a mouse cursor moving toward the text box, a mouse click within the text box, and followed by keystrokes within the text box.

In 540, the synthetic clickstreams are passed to another CNN, which, in this embodiment, may represent discriminator 212 for discriminating between the synthetic and actual clickstreams.

In 550, the model is trained based on discriminating between the synthetic and actual clickstreams. The CNN may then make a determination as to whether the synthetic clickstreams are from actual users.

In 560, a determination is made whether the model is sufficiently trained for testing websites. This determination may be based on the success rate of the CNN in being able to determine whether the synthetic clickstreams are from actual users. This success rate may be compared to a configurable predefined threshold. If not, another iteration of testing is performed starting at 530 with the generation of another set of synthetic clickstreams. If yes, method 500 proceeds to 570.

In 570, when the model is determined to be trained, it may be used to test a website which may include generating synthetic clickstreams, applying those generated synthetic clickstreams to a website and tracking the results of that application.

Figure 6:
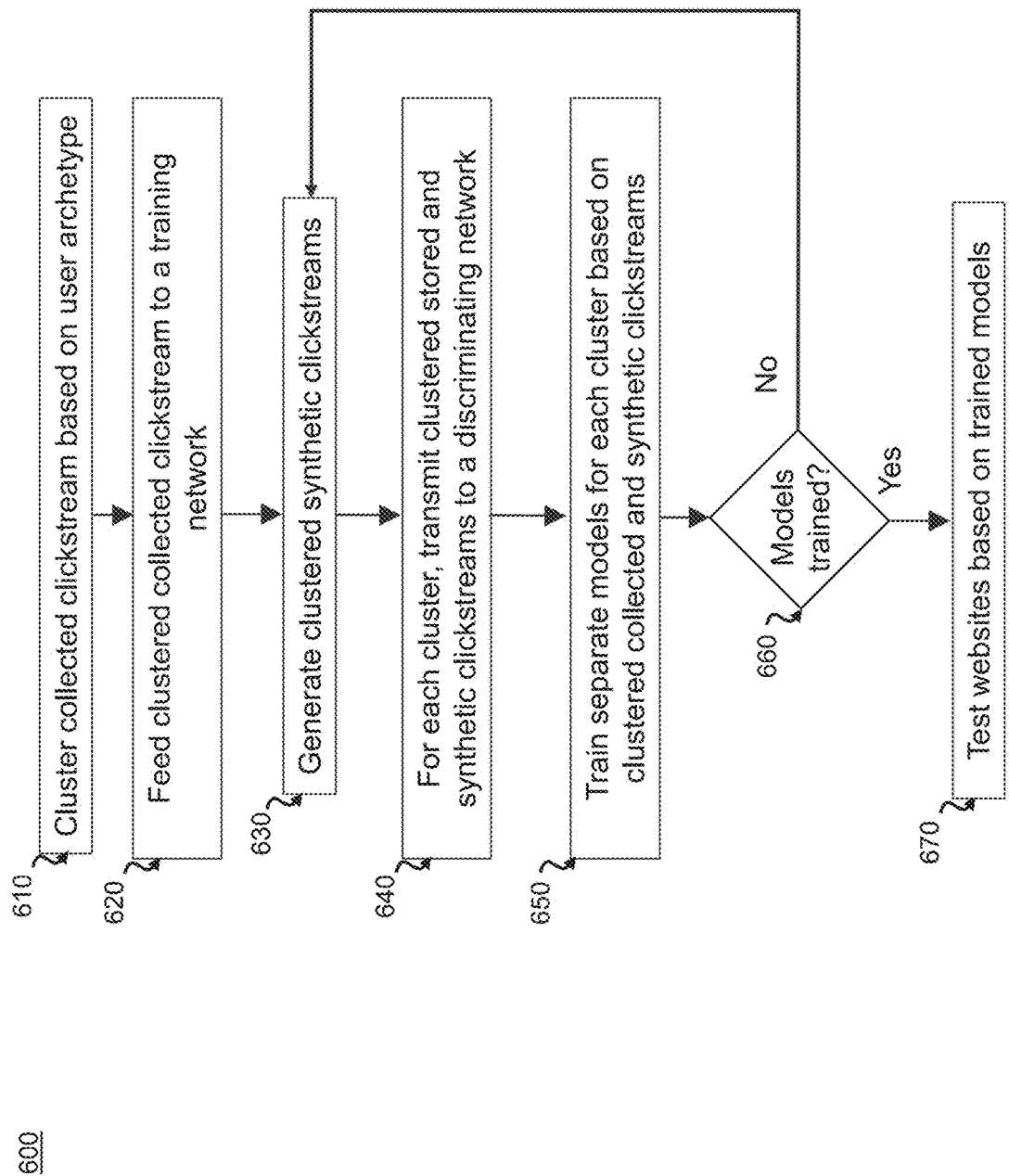
FIG. 6 depicts a flow diagram illustrating a flow for generating models based on clustered clickstreams and testing a website based on the generated models, according to some embodiments.

FIG. 6 depicts a flow diagram of an example method 600 a flow for generating models based on clustered clickstreams and testing a website based on the generated models, according to some embodiments. As a non-limiting example with regards to FIGS. 1-3, one or more processes described with respect to FIG. 4 may be performed by a server (e.g., server 130 of FIG. 1) or a synthetic clickstream generator (e.g., synthetic clickstream generator 140 of FIG. 1) for training a model based on synthetic clickstreams and testing the website based on the trained model. In such an embodiment, server 130 and/or synthetic clickstream generator 140 may execute code in memory to perform certain steps of method 400 of FIG. 4. While method 400 of FIG. 4 will be discussed below as being performed by server 130 and/or synthetic clickstream generator 140, other devices including may store the code and therefore may execute method 400 by directly executing the code. Accordingly, the following discussion of method 400 will refer to devices of FIGS. 1-3 as an exemplary non-limiting embodiment of method 400.

Moreover, it is to be appreciated that not all steps may be needed to perform the disclosure provided herein. Further, some of the steps may be performed simultaneously or in a different order than shown in FIG. 4, as will be understood by a person of ordinary skill in the art.

In 610, collected clickstreams are clustered based on user archetype (or a combination of user archetypes). Clustering the clickstreams may involve categorizing the user interactions into different groups with each group representing a different user archetype. Accordingly, each group or cluster of clickstreams represents the user interactions for a specific archetype.

In 620, each cluster of clickstreams is fed to a training neural network. In embodiment, the training neural network may be implemented as a CNN as discussed with respect to FIG. 5.

In 630, for each cluster of clickstreams, a set of synthetic clustered clickstreams are generated. Each set of the synthetic clustered clickstreams correspond to the user archetypes of the respective cluster of clickstreams that formed the basis of the generated set. Accordingly, each set of synthetic clustered clickstreams represents simulated user interactions for a specific archetype.

In 640, each set of synthetic clustered clickstreams are passed to a discriminating network, such as a CNN as discussed with respect to FIG. 5.

In 650, separate models are trained for each set of the synthetic clustered clickstreams in a similar manner as discussed with respect to 550 of FIG. 5. Each model is trained based on their respective set of synthetic clustered clickstreams and clustered collected clickstreams based on the model's ability to determine whether the synthetic clustered clickstreams are from actual users. Each trained model represents a simulated user of a specific archetype (or archetypes) which generates synthetic clickstreams for that specific archetype.

In 660, a determination is made whether the models are sufficiently trained for testing websites in a similar manner as discussed in 560 of FIG. 5. If no, another iteration of testing is performed starting at 630 with the generation of another set of synthetic clickstreams. If yes, method 600 proceeds to 670.

In 670, when the models are trained, they may be used to test a website which may include generating synthetic clickstreams, applying those generated synthetic clickstreams to a web site and tracking the results of that application. Since each model represents a different simulated archetype, the results provided by each model represent results specific to that specific user archetype. The results therefore may provide insights into user interactions of different user archetypes for the same website which would allow the website to be tailored differently. In this manner, the recommendations generated from the results for each archetype may be specific to improving the utility of the website. As a non-limiting example, there may be a trained model for users who access the website using mobile devices and a trained model for users who access the website using tablets. The results provided by using each trained model on a website may include recommendations for tailoring the content or layout of the website for each archetype. Accordingly, when implementing the website, there may be a specific website provided to users accessing the website on a mobile device and another specific website provided to users accessing the website on a tablet. The differences in the website would be based on the specific results provided by each respective trained model.

Figure 7:
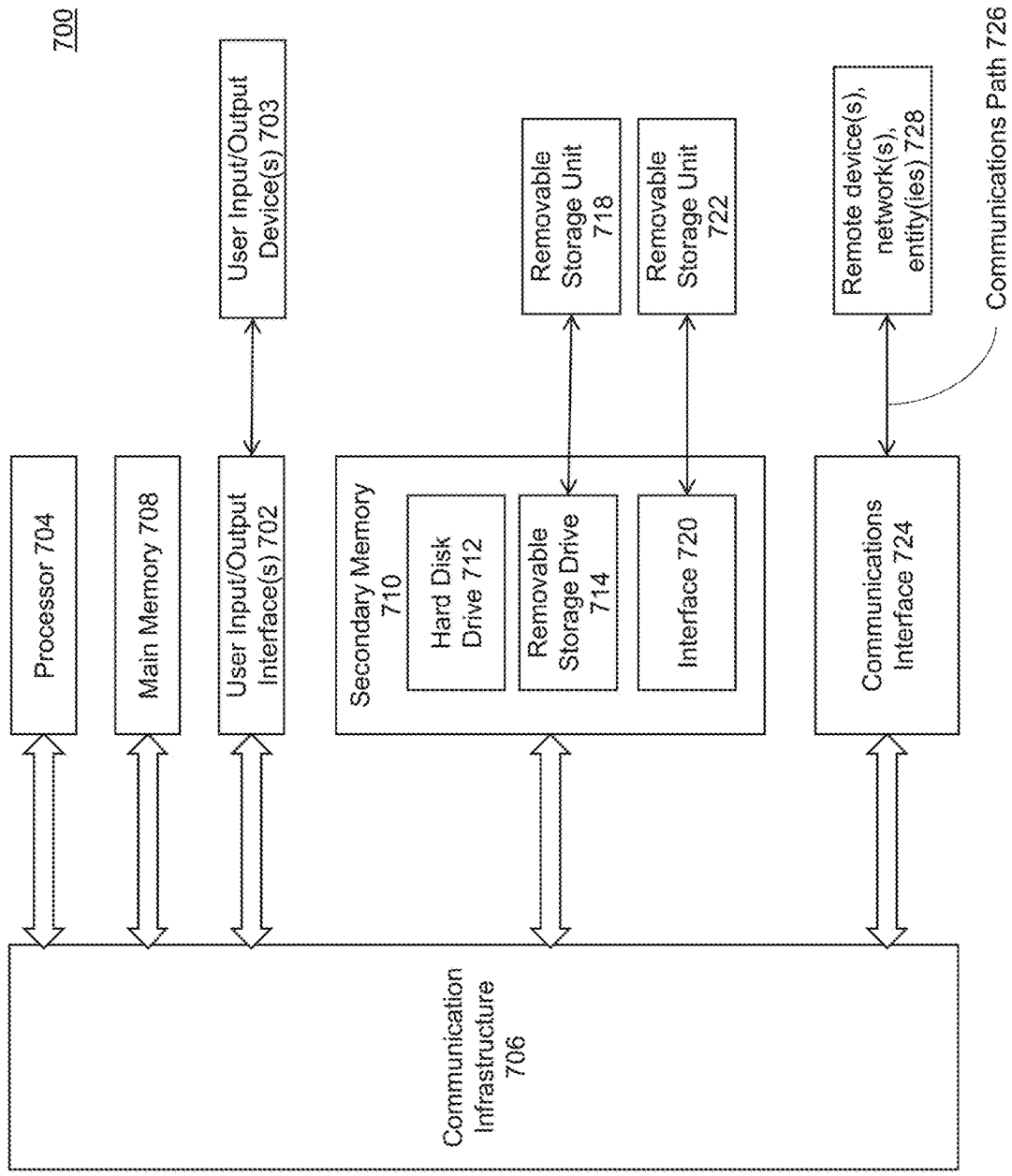
FIG. 7 depicts an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718.

Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for synthetically testing a website, the method comprising:
   receiving, by one or more computing devices of a trained neural network, clickstream data from at least one web server;
   performing, by the one or more computing devices, a test, using the trained neural network, of the website, wherein performing the test using the trained neural network comprises:
     generating, by the one or more computing devices of the trained neural network, synthetic clickstream data for a first variation of the website and for a second variation of the website, wherein the synthetic clickstream data is based on the clickstream data;
     simulating, by the one or more computing devices of the trained neural network, usage of the first variation of the website and the second variation of the website using the synthetic clickstream; and
     collecting, by the one or more computing devices of the trained neural network, a first result and a second result based on the simulating; and
   providing, by the one or more computing devices, the first variation of the website or the second variation of the website based on the first result and the second result.

2. The method of claim 1, wherein the clickstream data is associated with a plurality of users, the method further comprising:
   clustering, by the one or more computing devices, the clickstream data based on a user archetype to form at least a first cluster of the clickstream data and a second cluster of the clickstream data, wherein the synthetic clickstream data is generated based on the first cluster of the clickstream data and the neural network is trained based on the first cluster of the clickstream data; and
   selecting the trained neural network from a plurality of trained neural networks based on the user archetype.

3. The method of claim 2, wherein the user archetype includes at least one of a user age, a user network speed, a user income, and a characteristic of a device associated with a user.

4. The method of claim 2, wherein the characteristic of the device includes at least one of an operating system, a browser, and a battery life.

5. The method of claim 2, further comprising:
   generating, by the one or more computing devices, a second synthetic clickstream data based on the second cluster of the clickstream data;
   training, by the one or more computing devices, based on the second synthetic clickstream data and the second cluster of the clickstream data, a second neural network; and
   performing a second test, using the trained second neural network of the website.

6. The method of claim 5, wherein performing the second test comprises:
   generating, by the trained second neural network, a second synthetic clickstream for the first variation of the website and for the second variation of the web site; and
   collecting, by the trained second neural network, a third result and a fourth result based on simulating the second synthetic clickstream on the first variation of the website and on the second variation of the website.

7. The method of claim 1, wherein the trained neural network includes at least one of a generative adversarial network and a convolutional neural network.

8. The method of claim 1, wherein the trained neural network includes a generative adversarial network and a convolutional neural network, wherein generating the synthetic clickstream comprises:

providing, by the one or more computing devices, the clickstream data to the convolutional neural network;

generating, by the one or more computing devices using the convolutional neural network, at least one convolution based on the clickstream data; and generating, by the one or more computing devices and based on the at least one convolution, the synthetic clickstream data, wherein the synthetic clickstream data includes at least one predicted mouse movement.

9. The method of claim 1, further comprising:
training a neural network to form the trained neural network by:
comparing, by the one or more computing devices, the synthetic clickstream data to the clickstream data; and
classifying, by the neural network and based on the comparing, the synthetic clickstream data as either actual or synthetic.

10. The method of claim 9, wherein the first result comprises at least one of a first predicted conversion rate, a first predicted failure rate, and a first predicted usage metric and the second result comprises at least one of a second predicted conversion rate, a second predicted failure rate, and a second predicted usage metric.

11. A non-transitory computer-readable medium storing instructions, the instructions, when executed by a processor, cause the processor to perform operations comprising:
performing, using a first trained neural network and a second trained neural network, a test of a website, wherein the first trained neural network is trained based on a first user archetype and the second trained neural network is trained based on a second user archetype, and wherein performing the test comprises:
generating, by the first trained neural network, a first synthetic clickstream for a first variation of the website and for a second variation of the website, wherein the first synthetic clickstream is based on received clickstream data;
generating, by the second trained neural network, a second synthetic clickstream for the first variation of the website and for the second variation of the website, wherein the second synthetic clickstream is based on the received clickstream data;
performing, by the first trained neural network, a first simulation of usage of the first variation of the website and on the second variation of the website using the first synthetic clickstream;
collecting, by the first trained neural network, a first result and a second result based on the first simulation;
performing, by the second trained neural network, a second simulation of usage of the first variation of the website and on the second variation of the website using the second synthetic clickstream;
collecting, by the second trained neural network, a third result and a fourth result based on the second simulation; and
providing, based on the first result, the second result, the third result, and the fourth result, the first variation of the website or the second variation of the website.

12. The non-transitory computer-readable medium of claim 11, wherein the first trained neural network is trained based on a first cluster of collected clickstream data and the second trained neural network is trained based on a second cluster of the collected clickstream data.

13. The non-transitory computer-readable medium of claim 12, wherein the first trained neural network includes a generative adversarial network and a convolutional neural network and wherein training the first trained neural network comprises:
providing the collected clickstream data to the convolutional neural network;
generating, by the convolutional neural network, at least one convolution based on the collected clickstream data; and
generating, based on the at least one convolution, synthetic clickstream data, wherein the synthetic clickstream data includes at least one predicted mouse movement, wherein the first trained neural network is trained based on the synthetic clickstream data.

14. The non-transitory computer-readable medium of claim 13, the operations further comprising:
comparing the synthetic clickstream data to the first cluster of the collected clickstream data; and
classifying, by the first trained neural network and based on the comparing, the synthetic clickstream data as either an actual clickstream or a synthetic clickstream.

15. The non-transitory computer-readable medium of claim 11, wherein the first user archetype includes at least one of a user age, a user network speed, a user income, and a characteristic of a device associated with a user.

16. The non-transitory computer-readable medium of claim 15, wherein the characteristic of the device includes at least one of an operating system, a browser, and a battery life.

17. The non-transitory computer-readable medium of claim 11, wherein the first result comprises at least one of a first predicted conversion rate, a first predicted failure rate, and a first predicted usage metric and the second result comprises at least one of a second predicted conversion rate, a second predicted failure rate, and a second predicted usage metric.

18. An apparatus implementing a trained neural network for testing a web site, comprising:
a memory; and
a processor communicatively coupled to the memory and configured to:
receive clickstream data from at least one web server;
perform a test, using the trained neural network, of the website, wherein performing the test using the trained neural network comprises:
generating synthetic clickstream data for a first variation of the website and for a second variation of the website, wherein the synthetic clickstream data is based on the clickstream data;
simulating usage of the first variation of the website and on the second variation of the website using the synthetic clickstream; and
collecting a first result and a second result based on the simulating; and
provide, based on the first result and the second result, the first variation of the website or the second variation of the website.

19. The apparatus of claim 18, wherein the trained neural network includes at least one of a generative adversarial network and a convolutional neural network.

20. The apparatus of claim 18, wherein the trained neural network includes a generative adversarial network and a convolutional neural network, wherein in generating the synthetic clickstream, the processor is further configured to:
provide the clickstream data to the convolutional neural network;
generate, by the convolutional neural network, at least one convolution based on the clickstream data; and generate, based on the at least one convolution, the synthetic clickstream data, wherein the synthetic clickstream data includes at least one predicted mouse movement.

* * * * *